United States Patent [19]
Torrence

[11] Patent Number: 5,544,857
[45] Date of Patent: Aug. 13, 1996

[54] ELECTRICALLY OPERATED EXPANSION VALVE

[75] Inventor: Robert J. Torrence, Sanford, N.C.

[73] Assignee: Eaton Corporation, Cleveland, Ohio

[21] Appl. No.: 390,399

[22] Filed: Feb. 17, 1995

[51] Int. Cl.[6] .................................................... F16K 31/02
[52] U.S. Cl. ...................... 251/129.15; 335/262
[58] Field of Search ............... 251/129.01, 129.15, 251/129.16; 355/262

[56] References Cited

U.S. PATENT DOCUMENTS

| | | | |
|---|---|---|---|
| 4,452,424 | 6/1984 | Kawata | 251/129.15 |
| 4,892,285 | 1/1990 | Torrence | 251/129.15 X |
| 5,102,096 | 4/1992 | Siegel et al. | 251/129.15 |

Primary Examiner—Kevin Lee
Attorney, Agent, or Firm—Roger A. Johnston

[57] ABSTRACT

A valve and method of making same with a valve body defining an inlet and outlet and which communicate with a valving chamber. A cup-shaped glide member in the chamber is sealed over the outlet and has cross-ports over which slide a valving sleeve attached to a ferromagnetic armature. The armature slides in a guide tube which is sealed on the body and closes the valving chamber. The guide tube preferably has a magnetic pole piece attached the end remote from the body. The valving sleeve is attached to the armature in a manner which allows frictional slippage in the direction transverse to the armature motion to permit the sleeve to be guided by the glide member and the armature to be guided by the guide tube. A solenoid coil is received over the guide tube and preferably retained by engagement with the pole piece.

18 Claims, 2 Drawing Sheets

ELECTRICALLY OPERATED EXPANSION VALVE

BACKGROUND OF THE INVENTION

The present invention relates to electrically operated valves of the type employed for controlling expansion of fluid flowing in a fluid flow system. In refrigeration or air conditioning systems, electrically operated expansion valves can be used to control the flow of refrigerant to the evaporator or endothermic heat exchanger in order to maintain the desired amount of superheat of the refrigerant discharging from the evaporator. Heretofore, it has been common practice to employ a mechanical thermally responsive expansion valve for controlling refrigerant flow to the evaporator in a refrigeration or air conditioning system. Mechanical thermostatic expansion valves typically employ an hermetically sealed liquid filled chamber which senses the temperature of the refrigerant discharging from the evaporator; and, the temperature changes in the liquid cause expansion and contraction thereof, the forces of which are applied to a pressure responsive diaphragm for moving a valving element to control the flow in the line to the evaporator. Mechanical thermostatic expansion valves have experienced widespread use but have the disadvantage of being only reactive to a temperature in the system and not anticipatory of the ambient conditions. Additionally, mechanical thermostatic expansion valves are subject to deterioration of the hermetic sealing of the chamber over prolonged usage and loss of fluid from the chamber. Thus it has been desired to provide for electrical control of the refrigerant expansion valve in refrigeration and air conditioning systems, particularly air conditioning systems utilized in motor vehicles where the rate of change ambient conditions and thermal loading is relatively high.

Accordingly, it has long been desired to provide a simple design for an electric valve suitable for control of the expansion and flow of refrigerant and which is reliable and low in manufacturing costs and which may replace mechanical thermostatic expansion valves.

SUMMARY OF THE INVENTION

It is an object of the present invention to provide an electrically operated, electromagnetically actuated expansion valve which is easy to assemble, reliable and requires relatively low power for its operation.

It is a further object of the present invention to provide a solenoid operated expansion valve suitable for controlling refrigerant flow and having a valving sleeve slidable over a tube for progressively uncovering crossports responsive to increased levels of energization of the solenoid.

It is a further object of the present invention to provide a solenoid operated expansion valve which has a hollow tubular valving sleeve slidable over a tubular glide having a crossport therein with the valving sleeve connected for movement by an electromagnetic armature.

It is a further object of the present invention to provide a solenoid operated electric expansion valve suitable for controlling refrigerant flow and having non-magnetic armature guide forming part of the valving chamber with a magnetic pole piece attached a remote end of the armature guide and which provides increased flow with increasing energization of the solenoid.

The present invention provides in a solenoid operated expansion valve having a cross-ported glide tube formed as a cup-shaped member and attached over the valve inlet. A valving sleeve is slidably received over the glide tube and guided thereon and connected to a ferromagnetic armature for movement therewith. The valving sleeve can slip on the armature in a direction transverse to the direction of motion. The armature is guided by a non-magnetic armature guide attached sealingly to the valve body with a stationary pole piece attached to the remote end of the armature guide. Increasing levels of energization of the solenoid effect movement of the armature for progressively uncovering crossports in the glide tube for increasing flow. Preferably the solenoid external pole frame is secured to the stationary pole piece attached to the armature guide.

DETAILED DESCRIPTION

Figure 1:
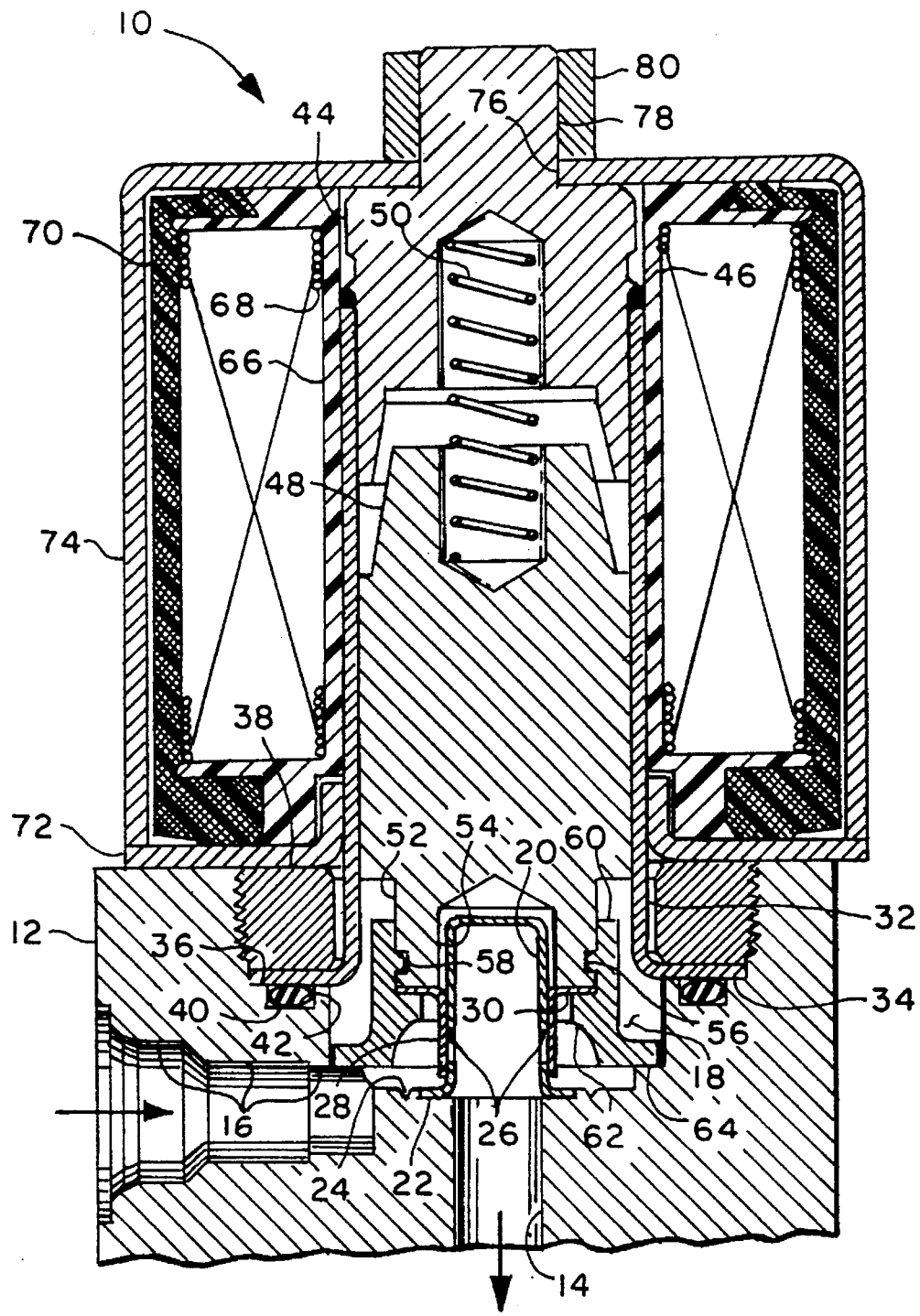
FIG. 1 is a cross-section of the assembled valve of the present invention taken through the plane of symmetry.
Figure 3:
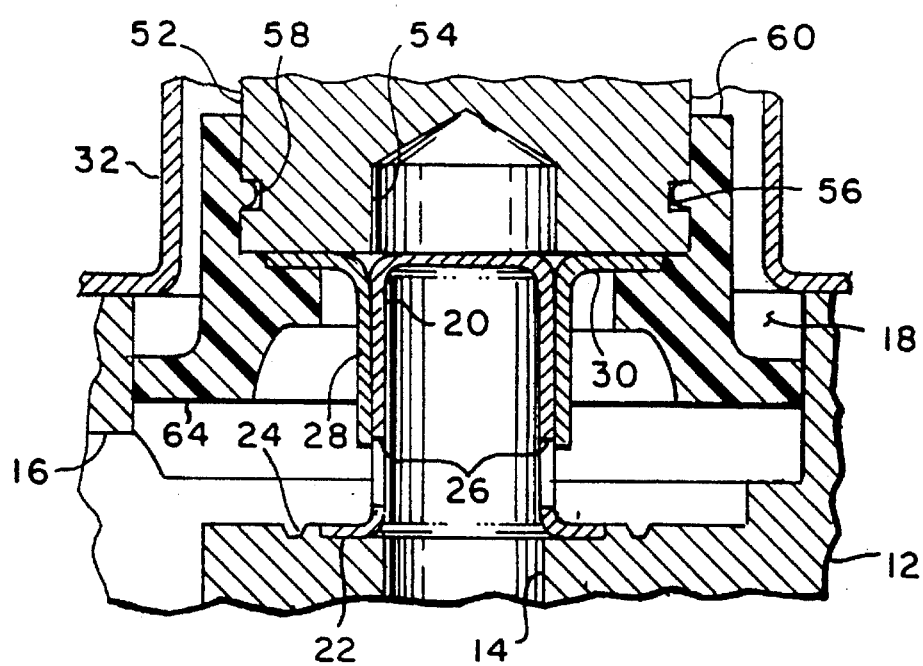
Figure 2:
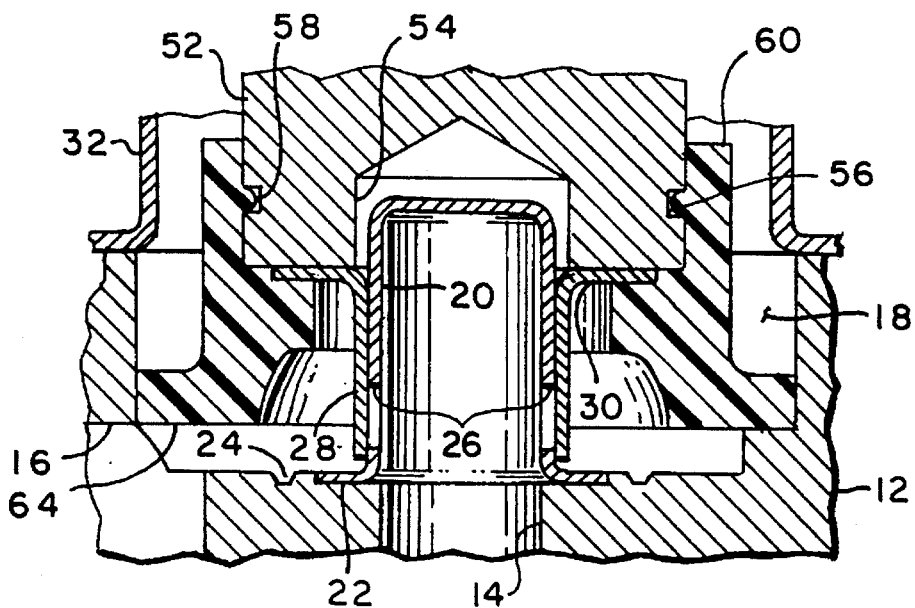
FIG. 2 is an enlarged view of a portion of the valve of FIG. 1 showing the glide tube in the closed position; and, FIG. 3 is a view similar to FIG. 2 showing the glide tube in the upward or open position.

Referring to the FIGS. 1, 2 and 3, the valve assembly is indicated generally at 10 and has a valve body 12 with an outlet passage 14 and an inlet passage 16. A valving chamber 18 is formed in the body 12 and communicates with both the inlet passage 14 and the outlet passage 16. A non-magnetic, preferably stainless steel, glide member or tube 20 having a generally cup-shaped configuration with an annular radially outward extending flange 22 formed about the open end thereof is disposed in the valving chamber and has the flange 22 attached over the passage 14 and secured thereabout by any suitable expedient as, for example, metal deformation indicated by a staked depression 24.

The glide tube 20 has at least one, and preferably a pair of diametrically opposed, ports 26 provided therein. A valving sleeve 28 is slidably received over the glide tube 20 in closely fitting arrangement and the sleeve 28 has an annular radially outwardly extending flange 30 formed thereon. In the presently preferred practice the valving sleeve 28 is formed of non-magnetic stainless steel.

Valving cavity 18 is closed by an armature guide tube 32 formed of nonmagnetic material closed at its upper end with the opposite or lower end thereof having an annular radially outwardly extending flange 34 formed thereon and which is registered in the flat bottom 36 of a counter bore formed in the body 12 and is retained thereagainst by a retaining ring 38 which in the present practice of the invention is received over tube 32 threadedly engaged in the body 12 bearing against flange 34. The flange 34 is sealed on its underside by a seal ring 40 received in an annular groove 42 formed in the bottom 36 of the counterbore. In the present practice of the invention, the upper end of guide tube 32 is closed by a magnetic pole piece 44 which is secured and sealed to the guide tube 32, preferably by weldment 46.

An armature 48 formed of material of high magnetic permeability is slidably received in the armature guide 32; and, the armature has a bias spring 50 with the lower end thereof registered against the upper end of the armature 48 and with the upper end of spring 50 registered against the underside of the pole piece 44. The spring is operative to urge the armature in a downward direction. It will be understood that the upper end of the armature 48 defines an air gap with the pole piece 44; and, upward travel of the armature 48 is limited by the upper end of the armature making contact with the pole piece thereby closing the air gap.

The lower end of armature 48 has a reduced diameter portion 52 which has a recess in the form of a blind bore 54 formed therein to provide clearance for the upper end of the glide tube 20. Armature portion 52 has an annular groove 56 formed thereabout which has engaged therein an annular rib 58 formed about the inner periphery of an annular collar member 60. Collar 60 has a radially inwardly extending annular flange 62 formed thereon which is registered against the underside of flange 30 of the valving sleeve and retains the sleeve in registration against the lower end of the armature 48. It will be understood that the outer periphery of the flange 30 on valving sleeve 28 is smaller in diameter than the inner periphery of collar 60 to permit relative radial movement of the valving sleeve 28 with respect to the armature and collar 60. This arrangement allows the valving sleeve 28 to be registered against and guided, in precision closely fitting arrangement, by the glide tube 20 yet have the armature move relative thereto in the transverse direction as needed to accommodate the fit and location of the armature in the guide 32, without the need for tight tolerance control of dimensions on the armature or guide tube. It will be understood that this arrangement permits the valving sleeve 28 to frictionally slip laterally with respect to the armature yet the sleeve 28 is secured in the longitudinal direction to the armature for movement therewith. This arrangement thus permits a precision fit of the valving sleeve 28 over the outer periphery of the sidewall of the glide tube 20; and, the armature and collar 60 provide clearance for the glide tube and valving sleeve 28.

The collar 60 has a radially outwardly extending flange 64 formed on the lower end thereof for registration against the body to limit the downward movement of the armature 48.

A coil bobbin 66 is received over the armature guide and has wound thereon a desired number of turns of conductive wire 68 to form the solenoid coil. In the present practice the invention the coil and bobbin are encapsulated with suitable plastic material as denoted by reference numeral 70.

Armature guide 56 has a pole washer 72 received thereover and registered against body 12 and contacted at its outer periphery by a pole frame 74 which extends upwardly and over the upper end of the bobbin. Frame 74 has a cut-out 76 formed therein for engaging a reduced diameter portion 78 of the pole piece 44 and the frame 74 is retained thereover by a fastener 80 which may be a frictional type fastener or threaded.

In operation, as the current flow in coil wire 68 is increased, the magnetic forces of attraction between the pole piece 44 and armature 48 are increased and overcome the bias of spring 50 and move the armature upward which causes the end of valving sleeve 28 to progressively uncover the ports 26 and permit increasing flow therethrough to the outlet passage 16. The valve construction of the present invention thus provides for a simple construction which is easy to assemble and which provides for precision fitting of the valving sleeve 28 over the glide tube 20 for accurate valving and minimal residual flow when the ports are covered in the solenoid de-energized state.

Although the present invention has been described with respect to the illustrated embodiments, it will be understood that the invention is capable of modification and variation and is limited only by the following claims.

We claim:

1. An electrically operated valve assembly comprising:
   (a) body means defining an inlet, an outlet and a valving chamber communicating with said inlet and outlet;
   (b) an armature guide means having a tubular configuration and formed from non-magnetic material and having a first end attached to said body means and sealed thereon for forming a portion of said valving chamber;
   (c) an armature, formed of material of high magnetic permeability and slidably disposed in said tubular guide means;
   (d) a glide tube having one end attached to said outlet and another end remote from said one end closed and extending into said valving chamber, said tube having at least one cross-port formed therein;
   (e) a valving sleeve attached to said armature for movement therewith and slidably engaging said glide tube in closely fitting arrangement; and,
   (f) solenoid means disposed about said armature guide means and operative upon electrical energization to effect movement of said armature, wherein said valving sleeve covers said at least one cross-port in the de-energized condition of said solenoid means and said valving sleeve progressively uncovers said at least one cross-port with increasing levels of energization of said solenoid means.

2. The valve assembly defined in claim 1, wherein said tubular guide means includes a ferromagnetic pole piece at an end thereof remote from said attachment to said body.

3. The valve assembly defined in claim 1, wherein said glide tube has said another end secured to said body by material deformation.

4. The valve assembly defined in claim 1, wherein said armature guide member has one end flanged and attached to said body by a retaining ring registering against said flange.

5. The valve assembly defined in claim 1, wherein said valving sleeve is secured to said armature in the direction of movement and permitted to float in a direction transverse to such movement.

6. The valve assembly defined in claim 1, wherein said glide tube has a pair of diametrically opposed cross-ports.

7. The valve assembly defined in claim 1, wherein said armature guide member has a ferromagnetic pole piece attached to one end thereof, and said solenoid includes a magnetic pole frame registered thereagainst.

8. The valve assembly defined in claim 1, further comprising means biasing said armature in a direction to close said sleeve over said at least one cross-port.

9. The valve assembly defined in claim 1, wherein said sleeve is retained on said armature by a tubular member snap-locked thereto.

10. The valve assembly defined in claim 1, wherein said glide tube is flanged at one end with the material of said body deformed against said flange for retaining said glide tube thereon.

11. The valve assembly defined in claim 1, wherein said solenoid includes a coil and pole frame having a cut-out therein received over a portion of said armature guide and retained thereon by a fastener.

12. A method of making an electrically operated expansion valve comprising:
   (a) forming a body with a valving cavity communicating with an inlet and outlet;
   (b) disposing a cup-shaped member having an aperture in the side wall thereof in said cavity and attaching said member over said outlet;
   (c) closing said cavity with a tubular guide member and sealing an end of said guide member on said body;
   (d) disposing an armature of material of high magnetic permeability in said guide member and guiding the armature for sliding movement therein;

(e) disposing a valving sleeve over said cup-shaped member;

(f) disposing a solenoid over said guide member and electromagnetically moving said armature and sleeve and progressively uncovering said port opening.

13. The method defined in claim 12, wherein the step of disposing a solenoid includes the step of attaching a magnetic pole frame to said armature guide member.

14. The method defined in claim 12, wherein the step of closing said cavity includes the step of forming said tubular member of non-magnetic material and attaching a ferromagnetic pole piece thereto.

15. The method defined in claim 12, wherein the step of disposing a valving sleeve includes attaching a sleeve to said armature and moving said sleeve therewith and permitting transverse floating movement thereof with respect to said armature.

16. The method defined in claim 12, wherein the step of closing said cavity includes the step of flanging said tubular member and disposing an annular member over said flange and securing said annular member to said body.

17. The method defined in claim 12, wherein the step of disposing a solenoid includes the steps of attaching a ferromagnetic pole piece to said guide member and securing a magnetic pole frame to said pole piece.

18. The method defined in claim 12, wherein the step of disposing a valving sleeve includes forming a flange on said sleeve and disposing a retainer over said flange and securing the retainer to said armature.

\* \* \* \* \*